(12) United States Patent
Yoshida et al.

(10) Patent No.: US 6,270,437 B1
(45) Date of Patent: Aug. 7, 2001

(54) BELT FOR CONTINUOUSLY VARIABLE TRANSMISSION

(75) Inventors: Hideaki Yoshida; Takamichi Shimada, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,449

(22) Filed: Aug. 31, 1999

(30) Foreign Application Priority Data

Feb. 9, 1998 (JP) .................................................. 10-248119

(51) Int. Cl.$^7$ ........................................................ F16G 1/22
(52) U.S. Cl. ............................................. 474/248; 474/242
(58) Field of Search ..................................... 474/201, 242, 474/245, 248, 272, 240, 244, 238

(56) References Cited

U.S. PATENT DOCUMENTS

| | | | |
|---|---|---|---|
| 4,619,634 | 10/1986 | Nakawaki | 474/201 |
| 4,826,473 | * 5/1989 | Kanehara et al. | 474/242 X |
| 5,004,450 | * 4/1991 | Ide | 474/242 |
| 5,019,020 | * 5/1991 | Van Lith | 474/242 X |
| 5,169,369 | * 12/1992 | Masuda et al. | 474/242 |
| 5,439,422 | * 8/1995 | Smeets | 474/242 |
| 6,090,004 | * 7/2000 | Kanehara et al. | 474/242 X |

FOREIGN PATENT DOCUMENTS

| | | | |
|---|---|---|---|
| 0 095 257 A1 | 11/1983 | (EP) | F16G/5/16 |
| 5-48364 | 7/1993 | (JP) . | |

* cited by examiner

*Primary Examiner*—David A. Bucci
*Assistant Examiner*—Marcus Charles
(74) *Attorney, Agent, or Firm*—Arent Fox Kintner Plotkin & Kahn

(57) ABSTRACT

By defining the contact ratio obtained by dividing the lateral width of a saddle surface of metal elements of a metal belt for a continuously variable transmission by the lateral width of a metal ring, the transmission capacity and durability of the metal belt can be enhanced. By gradually increasing the width of the metal ring in a state in which the lateral inner edges of the metal ring are in contact with the neck parts of the metal elements so as to gradually decrease the contact ratio, accompanying it the percentage change in the power transmission capacity gradually increases from the negative side and changes positive at a predetermined contact ratio. Therefore, by setting the contact ratio at the percentage change at which the transmission capacity changes from negative to positive as the upper limit of the contact ratio (92%), the percentage change in transmission capacity can be prevented from becoming negative thus preventing the transmission capacity and the durability of the metal rings from being degraded. The lower limit of the contact ratio (85%) is set at a value at which the lateral edges of the metal rings are not in contact with both the neck parts of the metal elements and the V-faces of the pulleys, when taking into consideration a misalignment between the pulleys.

8 Claims, 9 Drawing Sheets

BELT FOR CONTINUOUSLY VARIABLE TRANSMISSION

BACKGROUND OF THE INVENTION

1. Field of the Invention

The present invention relates to belts for a continuously variable transmission comprising metal rings formed as endless bands and a large number of metal elements supported along the metal rings, the belts transmitting drive power by being wrapped around a drive pulley and a driven pulley.

2. Description of the Prior Art

Since the durability of such belts for a continuously variable transmission is determined primarily by the durability of the metal rings, attempts have been made to enhance the durability by increasing the lateral width of the metal rings thereby decreasing the tensile stress.

Furthermore, Japanese Patent Publication No. 5-48364 describes a case where the metal rings are prevented from moving towards the neck parts of the metal elements by setting the circumference of the metal ring which is in contact with the saddle surfaces of the metal elements, which have been subjected to crowning, so that it is short at the lateral outer side and long at the lateral inner side.

When there is misalignment between the drive pulley and the driven pulley accompanying a change in the gear ratio of the continuously variable transmission, the metal rings move in a lateral direction inside the ring slots of the metal elements. Therefore, if the lateral width of the metal rings is increased in an attempt to enhance the durability thereof, a problem is caused in that the lateral edges of the metal rings come into contact with the neck parts of the metal elements or the V-faces of the pulleys and are worn. Moreover, there is a problem that due to the increase in the lateral width of the metal rings the lateral inner edge of the metal rings overhangs the saddle surfaces of the metal elements by a large amount when there is a misalignment, and thus flexural stress is applied to the metal rings thereby reducing their durability.

Furthermore, the case described in the above-mentioned publication has the problem that when the drive pulley and the driven pulley are misaligned, it is difficult to prevent the metal rings from coming into contact with the neck parts of the metal elements or the V-faces of the pulleys with certainty and no consideration is given to assuring the maximum power transmission capacity of the metal belt.

SUMMARY OF THE INVENTION

The present invention has been accomplished in view of the above-mentioned circumstances, and it is an object of the present invention to increase the transmission capacity and durability of the metal belt by defining an appropriate value for the contact ratio which is determined by dividing the lateral width of the saddle surface of the metal element by the lateral width of the metal ring.

In order to achieve the above-mentioned object, the invention is directed to a belt for a continuously variable transmission comprising right and left metal rings formed as endless bands and a large number of metal elements supported along the metal rings, the belt transmitting drive power by being wrapped around a drive pulley and a driven pulley. The metal elements comprise right and left ring slots which extend from a neck part in directions away from each other and are open at the sides at which they face the V-faces of the drive pulley or the driven pulley. The radially inner surfaces of the right and left metal rings which fit into the ring slots with a gap in the lateral direction, are in contact with the saddle surfaces of the metal elements. The contact ratio determined by dividing the lateral width of the saddle surface by the lateral width of the metal ring is defined as being between an upper limit and a lower limit, the upper limit being defined as a contact ratio at which, the contact ratio is decreased by increasing the lateral width of the metal rings in a state in which the lateral inner edges of the metal rings are in contact with the neck parts of the metal elements. An increase in transmission capacity due to the increase in lateral width of the metal rings is counterbalanced by a decrease in transmission capacity due to the overhang of the metal rings from the saddle surfaces. The lower limit is defined as a contact ratio at which, when the contact ratio is decreased in a state in which the lateral inner edges of the metal rings are in contact with the neck parts of the metal elements, the lateral outer edges of the metal rings coming into contact with the V-faces of the drive pulley or the driven pulley.

Further, when misalignment is present between the drive pulley and the driven pulley, the lower limit is defined as a contact ratio at which the lateral outer edges of the metal rings come into contact with the V-faces of the drive pulley or the driven pulley.

The present invention is also directed to a belt for a continuously variable transmission comprising a metal ring formed as an endless band and a large number of metal elements supported along this metal ring, the endless band and metal elements transmitting drive power by being wrapped around a drive pulley and a driven pulley. The metal elements comprise right and left ring slots which extend from right and left neck parts in directions towards each other and are open at the sides at which they face each other. The radially inner surface of the metal ring which fits into the ring slots with a gap in the lateral direction, and is in contact with the saddle surface between the right and left ring slots. The contact ratio determined by dividing the lateral width of the saddle surface by the lateral width of the metal ring is defined as being between an upper limit and a lower limit. The upper limit is defined as a contact ratio at which, the contact ratio is decreased by increasing the lateral width of the metal ring in a state in which one lateral edge of the metal ring is in contact with the neck parts on one side of the metal elements. An increase in transmission capacity due to the increase in the lateral width of the metal ring is counterbalanced by a decrease in transmission capacity due to the overhang of the metal ring from the saddle surface. The lower limit is defined as a contact ratio at which, when the contact ratio is decreased in a state in which one lateral edge of the metal ring is in contact with the neck parts on one side of the metal elements, the other lateral edge of the metal ring comes into contact with the neck parts on the other side.

Further, when misalignment is present between the drive pulley and the driven pulley, the lower limit is defined as a contact ratio at which the other lateral edge of the metal ring comes into contact with the neck parts on the other side.

By gradually increasing the lateral width of the metal rings in a state in which the lateral outer edges of the metal rings are in contact with the V-faces of the pulleys so as to gradually decrease the contact ratio, a positive percentage change in power transmission capacity is maintained. By gradually increasing the lateral width of the metal rings in a state in which the lateral inner edges of the metal rings are in contact with the neck parts of the metal elements so as to gradually decrease the contact ratio, the percentage change in power transmission capacity gradually increases from the negative side as a result, and becomes positive at a predetermined contact ratio. Therefore, by setting the predetermined contact ratio at which the percentage change in power transmission capacity changes from negative to positive as the maximum contact ratio, the percentage change in power transmission capacity can be prevented from becoming negative and thus degradation of the transmission capacity and the durability of the metal rings can be prevented.

When the contact ratio is further decreased by further increasing the lateral width of the metal rings, since the lateral outer edges of the metal rings come into contact with the V-faces of the pulleys, by setting the contact ratio at this point to be the minimum contact ratio, degradation of the durability due to the lateral edges of the metal rings coming into contact with both the neck parts of the metal elements and the V-faces of the pulleys can be prevented.

If the lower limit of the contact ratio is set by taking into consideration misalignment of the drive pulley and the driven pulley, even when misalignment is present, the lateral edges of the metal rings can be prevented from coming into contact with both the neck parts of the metal elements and the V-faces of the pulleys.

By gradually increasing the lateral width of the metal ring in a state in which one lateral edge of the metal ring is in contact with the neck parts on one side of the metal elements so as to gradually decrease the contact ratio, the percentage change in power transmission capacity gradually increases from negative, and as a result and becomes positive at a predetermined contact ratio. Therefore, by setting the predetermined contact ratio at which the percentage change in power transmission capacity changes from negative to positive, as the maximum contact ratio, the percentage change in power transmission capacity can be prevented from becoming negative and thus degradation of the transmission capacity and the durability of the metal ring can be prevented.

When the contact ratio is further decreased by further increasing the lateral width of the metal ring, since the other lateral edge of the metal ring comes into contact with the neck parts on the other side of the metal elements, by setting the contact ratio at this point to be the lower limit of the contact ratio, degradation of the durability due to the lateral edges of the metal ring coming into contact with both the right and left neck parts of the metal elements, can be prevented.

The lower limit contact ratio is set by taking into consideration a misalignment between the drive pulley and the driven pulley, and even when a misalignment is present, the lateral edges of the metal ring can be prevented from coming into contact with both the right and left neck parts of the metal elements.

BRIEF DESCRIPTION OF THE DRAWINGS

FIG. 1 is an outline diagram of the power transmission system of a vehicle in which a continuously variable transmission is mounted.

FIG. 2 is a perspective view of a part of the metal belt.

FIG. 3 is an illustration showing a state in which a metal ring assembly has moved laterally outwards.

FIG. 4 is an illustration showing a state in which a metal ring assembly has moved laterally inwards.

FIG. 5 is an illustration for explaining the misalignment between a drive pulley and a driven pulley.

FIG. 6 is a graph illustrating the change in amount of the lateral stroke of the metal ring assembly and the misalignment.

FIG. 7 is a graph illustrating the relationship between the contact ratio and the percentage change in transmission capacity in a state in which the metal ring assembly has moved laterally outwards.

FIG. 8 is a graph illustrating the relationship between the contact ratio and the percentage change in transmission capacity in a state in which the metal ring assembly has moved laterally inwards.

FIG. 9 is a cross-sectional view of a metal belt according to a second embodiment of the present invention.

FIG. 10 is a view showing a state in which one lateral edge of the metal ring assembly is in contact with the neck part on one side of the metal element.

DETAILED DESCRIPTION OF THE PREFERRED EMBODIMENT

Figure 1:
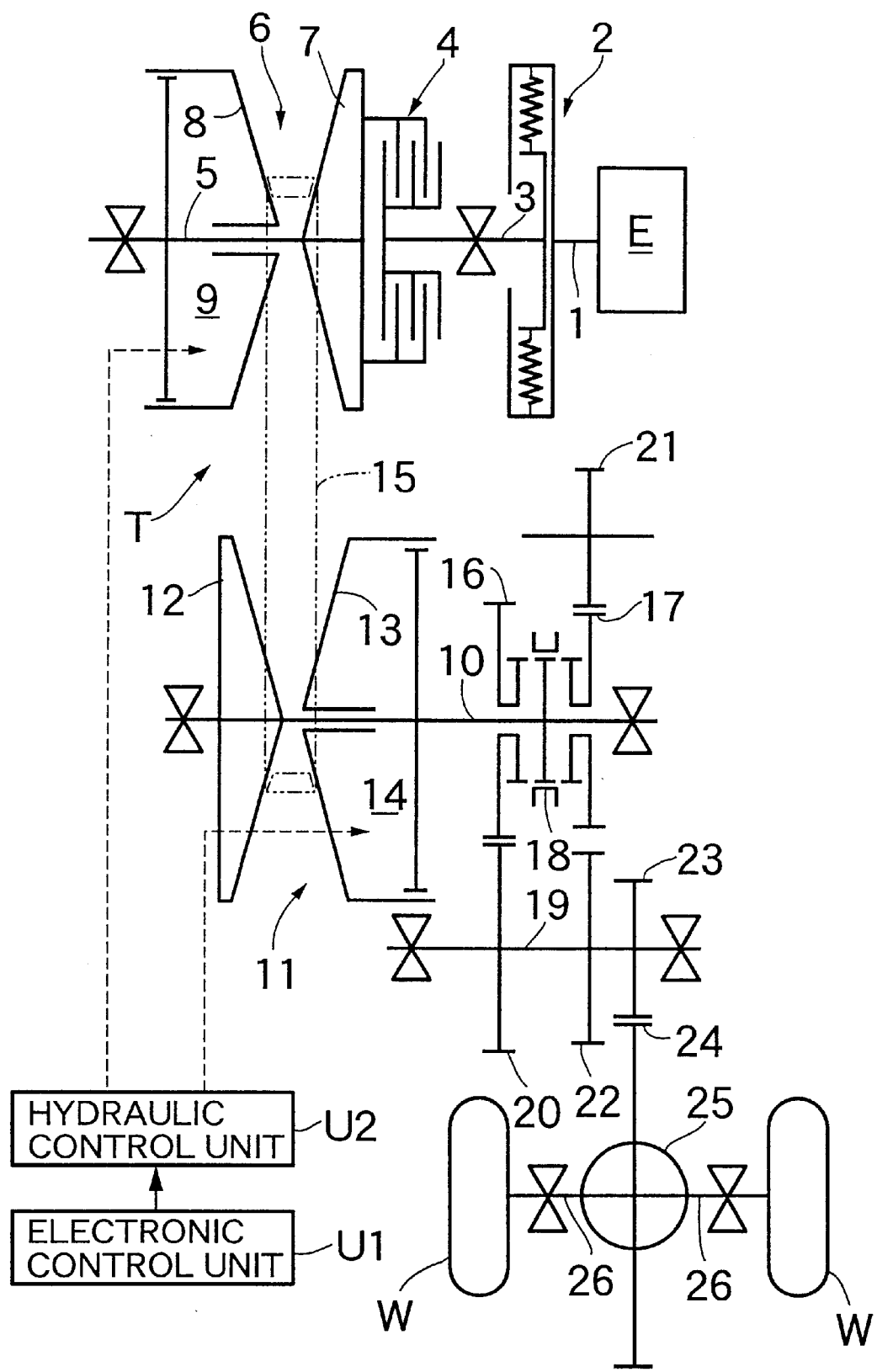
FIG. 1 to FIG. 8 illustrate a first embodiment of the present invention.

FIG. 1 shows an outline of the structure of a metal belt type continuously variable transmission T mounted in a motor vehicle, in which an input shaft 3 connected to the crankshaft 1 of an engine E via a damper 2, is connected to a drive shaft 5 of the metal belt type continuously variable transmission T via a starting clutch 4. A drive pulley 6 mounted on the drive shaft 5 comprises a stationary pulley half 7 which is secured to the drive shaft 5 and a movable pulley half 8 which is movable towards and away from the stationary pulley half 7. The movable pulley half 8 is pushed towards the stationary pulley half 7 by means of hydraulic pressure applied to an oil chamber 9.

A driven pulley 11 mounted on a driven shaft 10 which is positioned parallel to the drive shaft 5, comprises a stationary pulley half 12 which is secured to the driven shaft 10 and a movable pulley half 13 which is movable towards and away from the stationary pulley half 12. The movable pulley half 13 is pushed towards the stationary pulley half 12 by means of hydraulic pressure applied to an oil chamber 14. A metal belt 15 formed by supporting a large number of metal elements 32 on a pair of right and left metal ring assemblies 31, 31 (see FIG. 2), is wrapped around both the drive pulley 6 and the driven pulley 11. Each metal ring assembly 31 is formed by layering, for example, 12 sheets of metal ring 33.

The driven shaft 10 carries a forward drive gear 16 and a reverse drive gear 17 in a relatively rotatable manner. The forward drive gear 16 and reverse drive gear 17 can be connected selectively to the driven shaft 10 by means of a selector 18. An output shaft 19 positioned parallel to the driven shaft 10, is secured with a forward driven gear 20 which is meshed with the forward drive gear 16 and a reverse driven gear 21 which is meshed with the reverse drive gear 17 via the reverse idler gear 21.

The rotation of the output shaft 19 is input to a differential 25 via a final drive gear 23 and a final driven gear 24 and is transmitted therefrom to drive wheels W, W via right and left axles 26, 26.

The drive power of the engine E is thus transmitted to the driven shaft 10 via the crankshaft 1, the damper 2, the input shaft 3, the starting clutch 4, the drive shaft 5, the drive pulley 6, the metal belt 15 and the driven pulley 11. When the forward travel range is selected, the drive power of the driven shaft 10 is transmitted to the output shaft 19 via the forward drive gear 16 and forward driven gear 20, and the vehicle is thus driven forward. When the reverse travel range is selected, the drive power of the driven shaft 10 is transmitted to the output shaft 19 via the reverse drive gear 17, reverse idler gear 21 and reverse driven gear 22, and thus the vehicle is driven backwards.

At this stage, by controlling the hydraulic pressures applied to the oil chamber 9 of the drive pulley 6 and the oil chamber 14 of the driven pulley 11 of the metal belt type continuously variable transmission T, by means of a hydraulic control unit $U_2$ operated by commands from an electronic control unit $U_1$, the gear ratio can be adjusted continuously. That is to say, by increasing the hydraulic pressure applied to the oil chamber 14 of the driven pulley 11 relative to the hydraulic pressure applied to the oil chamber 9 of the drive pulley 6, the groove width of the driven pulley 11 decreases thus increasing the effective radius; accompanying this the groove width of the drive pulley 6 increases thus decreasing the effective radius, and therefore the gear ratio of the metal belt type continuously variable transmission T, changes towards "LOW" in a continuous manner. On the other hand, by increasing the hydraulic pressure applied to the oil chamber 9 of the drive pulley 6 relative to the hydraulic pressure applied to the oil chamber 14 of the driven pulley 11, the groove width of the drive pulley 6 decreases thus increasing the effective radius; accompanying this the groove width of the driven pulley 11 increases thus decreasing the effective radius, and therefore the gear ratio of the metal belt type continuously variable transmission T, changes towards "OD" in a continuous manner.

Figure 2:
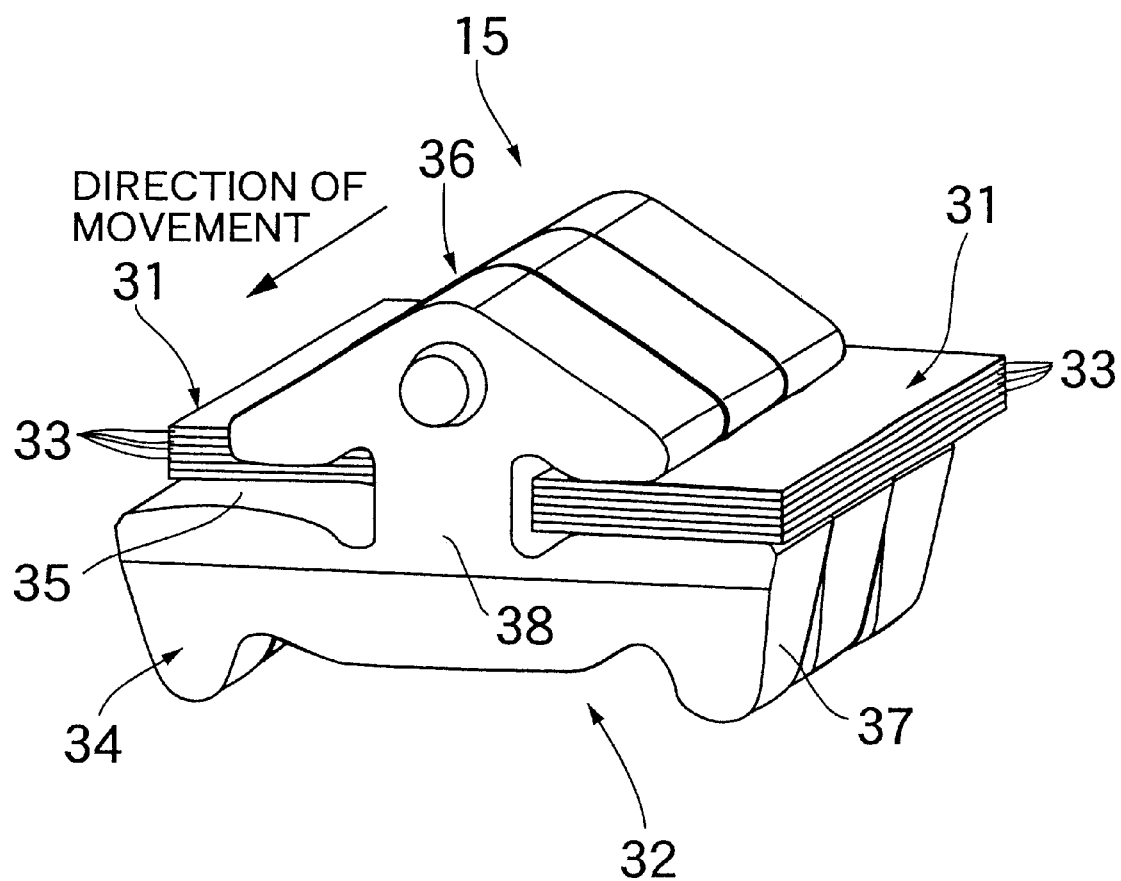

As shown in FIG. 2, the metal element 32 formed by subjecting a metal sheet to stamping comprises an element main body 34 having a substantially trapezoidal shape and an ear part 36 having a substantially triangular shape which is connected to the top of the main body 34 via a pair of right and left ring slots 35, 35 into which the metal ring assemblies 31, 31 are fitted. On both the right and left sides of the element main body 34, a pair of pulley contact surfaces 37, 37 are formed which make contact with the V-faces 30, 30 of the drive pulley 6 or the driven pulley 11 (see FIG. 3 and FIG. 4). The ear part 36 and the element main body 34 of the metal element 32 are connected via a narrow neck part 38, the ring slots 35, 35 are enclosed on three sides by the element main body 34, the ear part 36 and the neck part 38, and the remaining one direction (laterally outwards) is enclosed by the V-faces 30, 30 of the drive pulley 6 or the driven pulley 11 which make contact with the pulley contact surfaces 37, 37.

Figure 3:
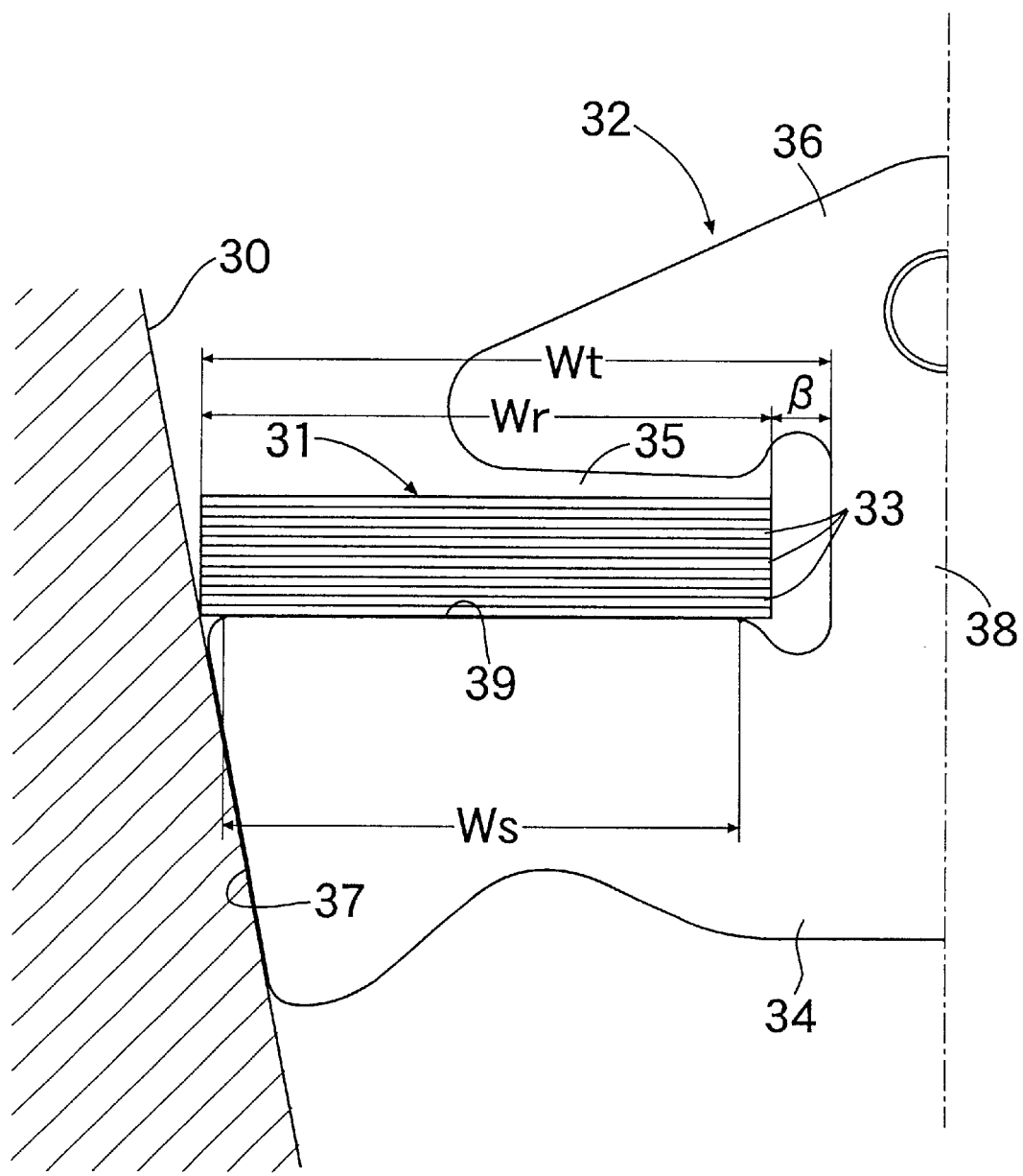
Figure 4:
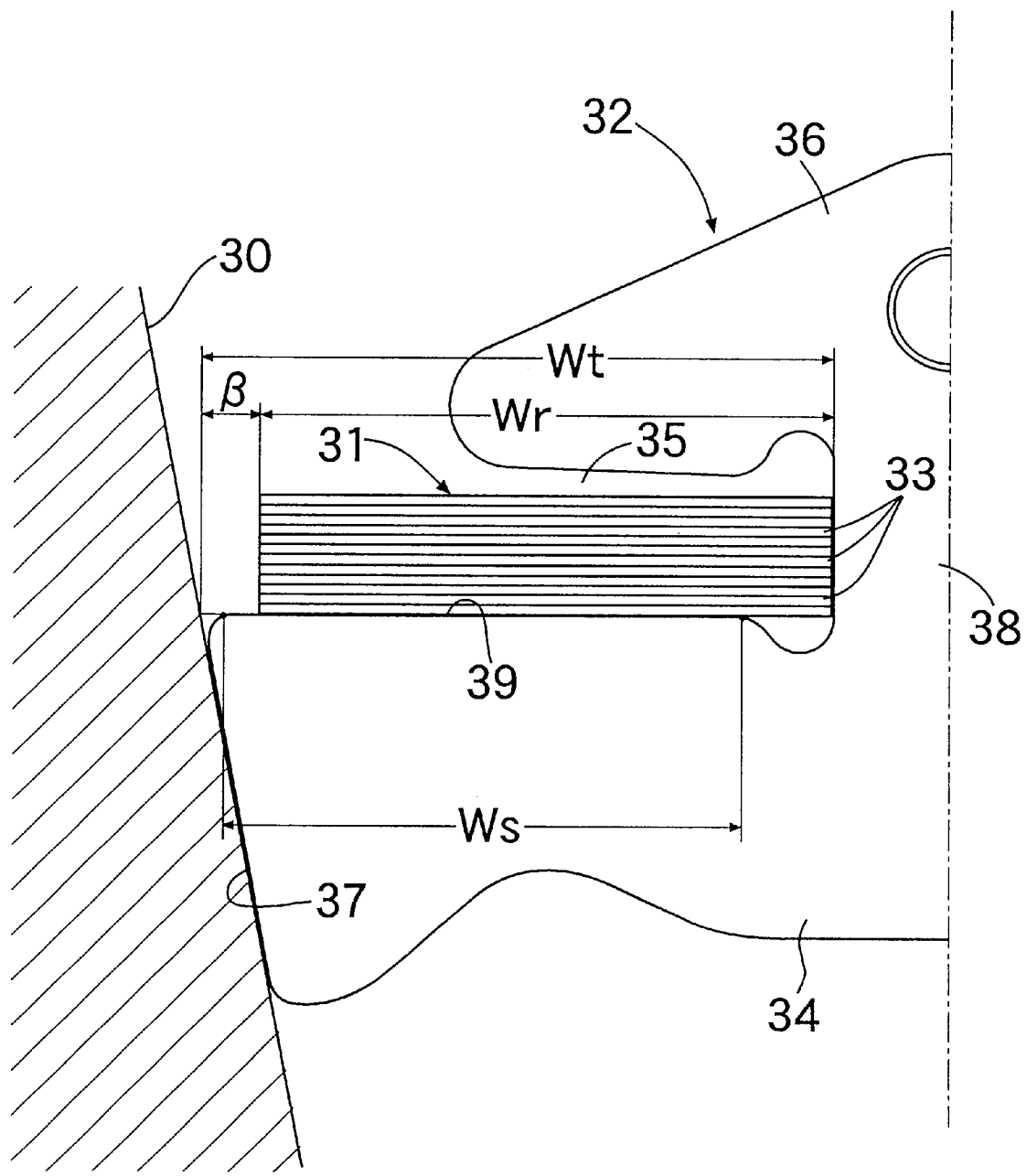

As is clear from FIG. 3 and FIG. 4, the radially inner surface of the metal ring assembly 31 which fits in the ring slot 35 of the metal element 32 is in contact with a saddle surface 39 formed on the ring slot 35. The distance Wt between the V-face 30 of the drive pulley 6 or the driven pulley 11 and the neck part 38 of the metal element 32 is set so as to be larger than the lateral width Wr of the metal ring assembly 31 by a gap β, and therefore the metal ring assembly 31 can move laterally within the gap β FIG. 3 shows a state in which the metal ring assembly 31 has moved laterally outwards in the ring slot 35 and the lateral outer edge thereof is in contact with the V-face 30, and at this point the lateral inner edge of the metal ring assembly 31 faces the neck part 38 with a gap β between them. FIG. 4 shows a state in which the metal ring assembly 31 has moved laterally inwards in the ring slot 35 and the lateral inner edge thereof is in contact with the neck part 38, and at this point the lateral outer edge of the metal ring assembly 31 faces the V-face 30 with a gap β between them.

The lateral width Ws of the saddle surface 39 of the metal element 32 is set so as not to be larger than the lateral width Wr of the metal ring assembly 31, and therefore in the state shown in FIG. 3 the lateral inner edge of the metal ring assembly 31 overhangs the lateral inner edge of the saddle surface 39 on the side of the neck part 38. Here, the value obtained by dividing the lateral width Ws of the saddle surface 39 by the lateral width Wr of the metal ring assembly 31 is defined as the contact ratio C=Ws/Wr≦100%.

Figure 5:
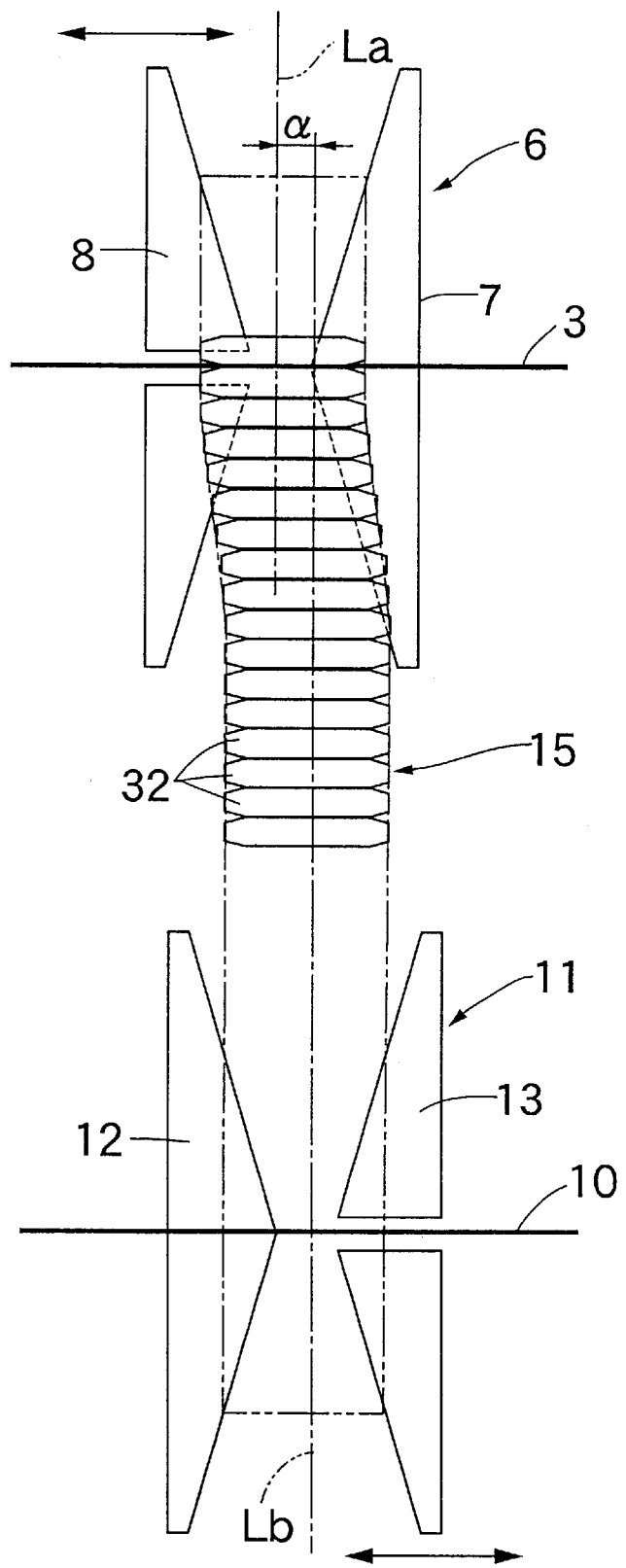

As shown in FIG. 5, in a belt type continuously variable transmission in which a metal belt 15 is wrapped around a drive pulley 6 and a driven pulley 11, the stationary pulley half 7 of the drive pulley 6 is placed diagonally with respect to the stationary pulley half 12 of the driven pulley 11, and the movable pulley half 8 of the drive pulley 6 is placed diagonally with respect to the movable pulley half 13 of the driven pulley 11. Therefore, when the movable pulley halves 8 and 13 of the drive pulley 6 and the driven pulley 11 move towards and away from the stationary pulley halves 7, 12, the V-groove centerline La of the drive pulley 6 does not coincide with the V-groove centerline Lb of the driven pulley 11, resulting in a small misalignment α. Thus, when the misalignment α is present between the drive pulley 6 and the driven pulley 11, the metal ring assemblies 31, 31 move laterally inside the ring slots 35, 35 of the metal element 32.

Figure 6:
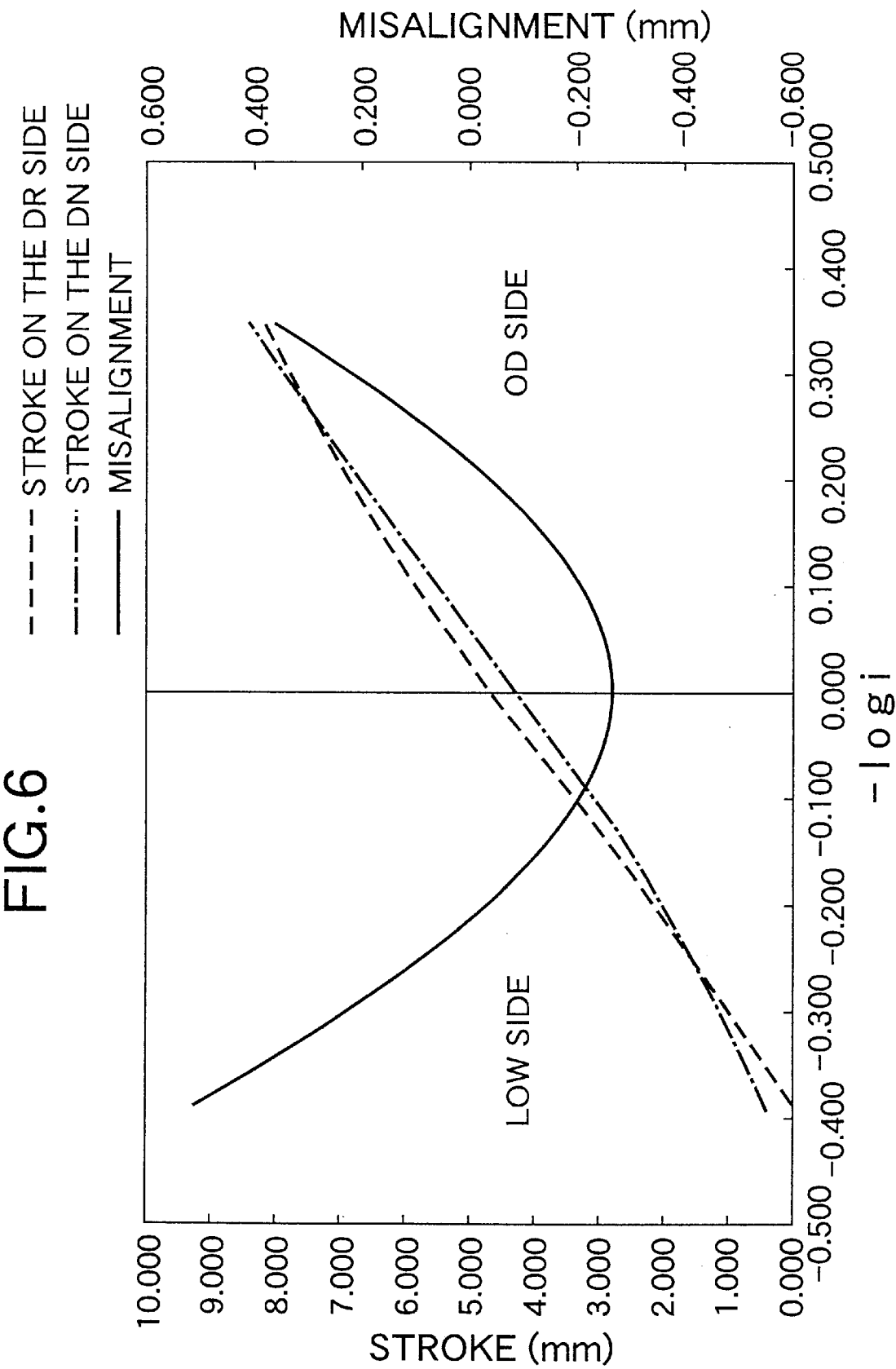

In FIG. 6, the abscissa represents the gear ratio i (−log i) of the belt type continuously variable transmission and the ordinates denote the misalignment and the lateral stroke of the metal ring assembly 31. It can be seen from the figure that when the gear ratio i (−log i) changes, the misalignment changes in a parabolic manner and the lateral stroke of the metal ring assembly 31 changes linearly.

Setting the above-mentioned contact ratio C in order to enhance the durability of the metal belt 15 is explained below.

Figure 7:
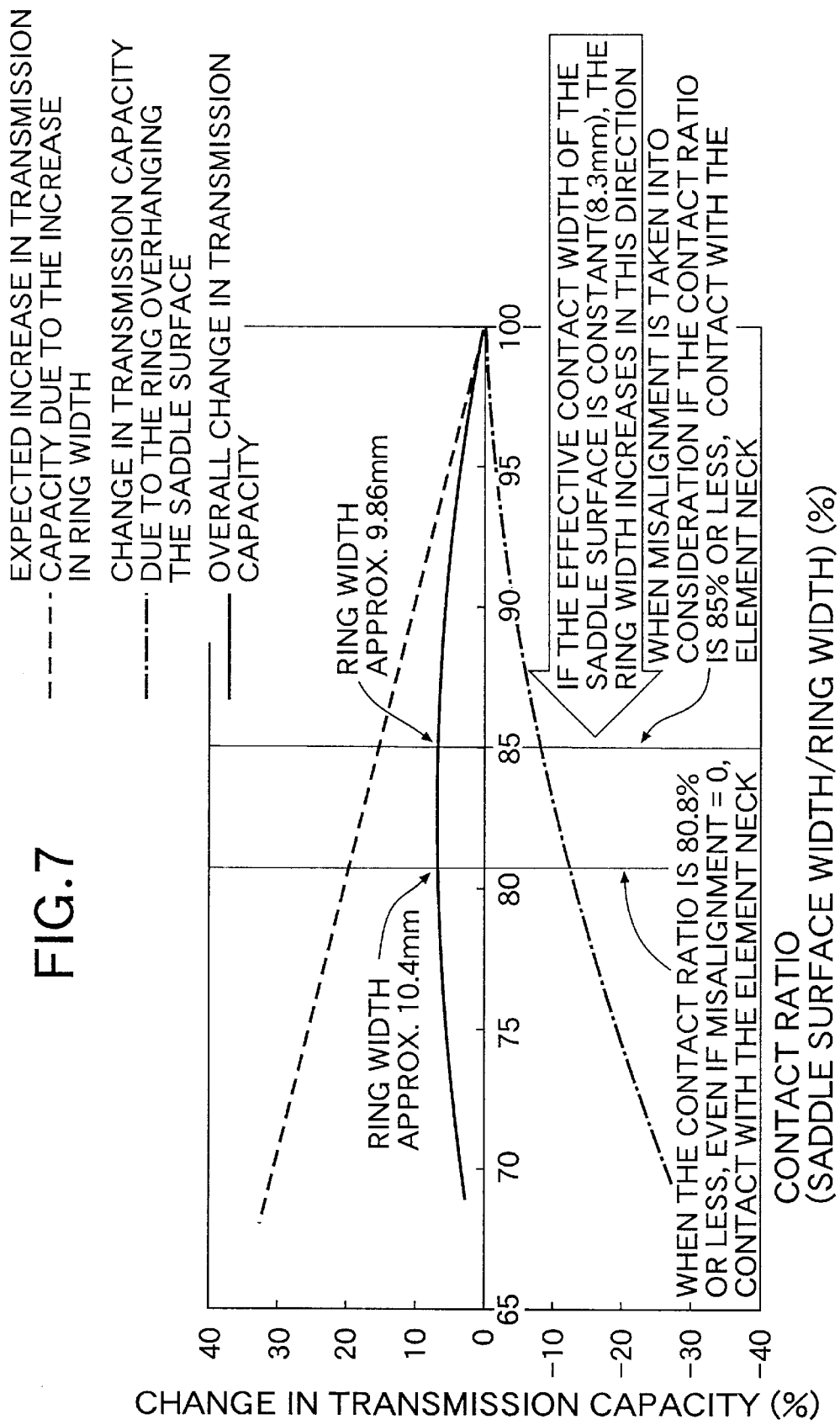

The graph shown in FIG. 7 corresponds to a state in which the metal ring assembly 31 has moved towards the lateral outer edge of the ring slot 35 and is in contact with the V-face 30 of the drive pulley 6 or the driven pulley 11 (see FIG. 3), the abscissa represents the contact ratio C and the ordinate represents the percentage change in power transmission capacity of the metal belt 15. The right end of the abscissa corresponds to a state in which the contact ratio C=100% (a state in which the lateral width Wr of the metal ring assembly 31 is set so as to be equal to the lateral width Ws of the saddle surface 39), and when the lateral width Wr of the metal ring assembly 31 is gradually increased from the above level while maintaining the lateral width Ws of the saddle surface 39 constant, the contact ratio C gradually decreases from 100%.

As is clear when FIG. 3 and FIG. 7 are taken together, as the lateral width Wr of the metal ring assembly 31 is increased, the cross section thereof also increases thus increasing the transmission capacity of the metal belt 15. Therefore, if the state in which the contact ratio C=100% is taken as a reference, the percentage change in transmission capacity increases linearly from 0 in the positive direction as the lateral width Wr of the metal ring assembly 31 increases (i.e. as the contact ratio C decreases).

On the other hand, when the lateral width Wr of the metal ring assembly 31 is increased, the extent to which the lateral inner edge of the metal ring assembly 31, whose lateral outer edge is defined as being in contact with the V-face 30, overhangs towards the neck part 38 increases. Thus, if the metal ring assembly 31 overhangs the saddle surface 39, the edge of the saddle surface 39 makes strong contact with the radially inner surface of the metal ring assembly 31 thus degrading the fatigue strength. As a result, if the state in which the contact ratio C=100% is taken as a reference, the percentage change in transmission capacity decreases in a quadric manner from 0 in the negative direction as the lateral width Wr of the metal ring assembly 31 increases (i.e. as the contact ratio C decreases) (see the dotted broken line in FIG. 7).

If the increase in transmission capacity accompanying the increase in cross section of the metal ring assembly 31 is counterbalanced by the decrease in transmission capacity accompanying the increase in the amount of overhang of the metal ring assembly 31, the overall change in transmission capacity can be illustrated by the solid line in FIG. 7. This overall change in transmission capacity is positive in the range in which the contact ratio C is in the range from 100% to 70%, suggesting that when the contact ratio C is in the range from 100% to 70%, a transmission capacity which is larger than the transmission capacity obtained at a contact ratio C=100% can be obtained.

In addition, when the lateral width Wr of the metal ring assembly 31 increases, even if the misalignment α is 0, the lateral inner edge of the metal ring assembly 31 comes into contact with the neck part 38 at a contact ratio C=80.8%; if the misalignment α is taken into consideration the lateral inner edge of the metal ring assembly 31 comes into contact with the neck part 38 at a contact ratio C=85%, and therefore the actually allowable range for the contact ratio C is from 100% to 85%. In the actually allowable range for the contact ratio C, i.e., 100% to 85%, as described above, the percentage change in transmission capacity becomes positive and it is expected that the durability of the metal belt 15 will be enhanced.

Figure 8:
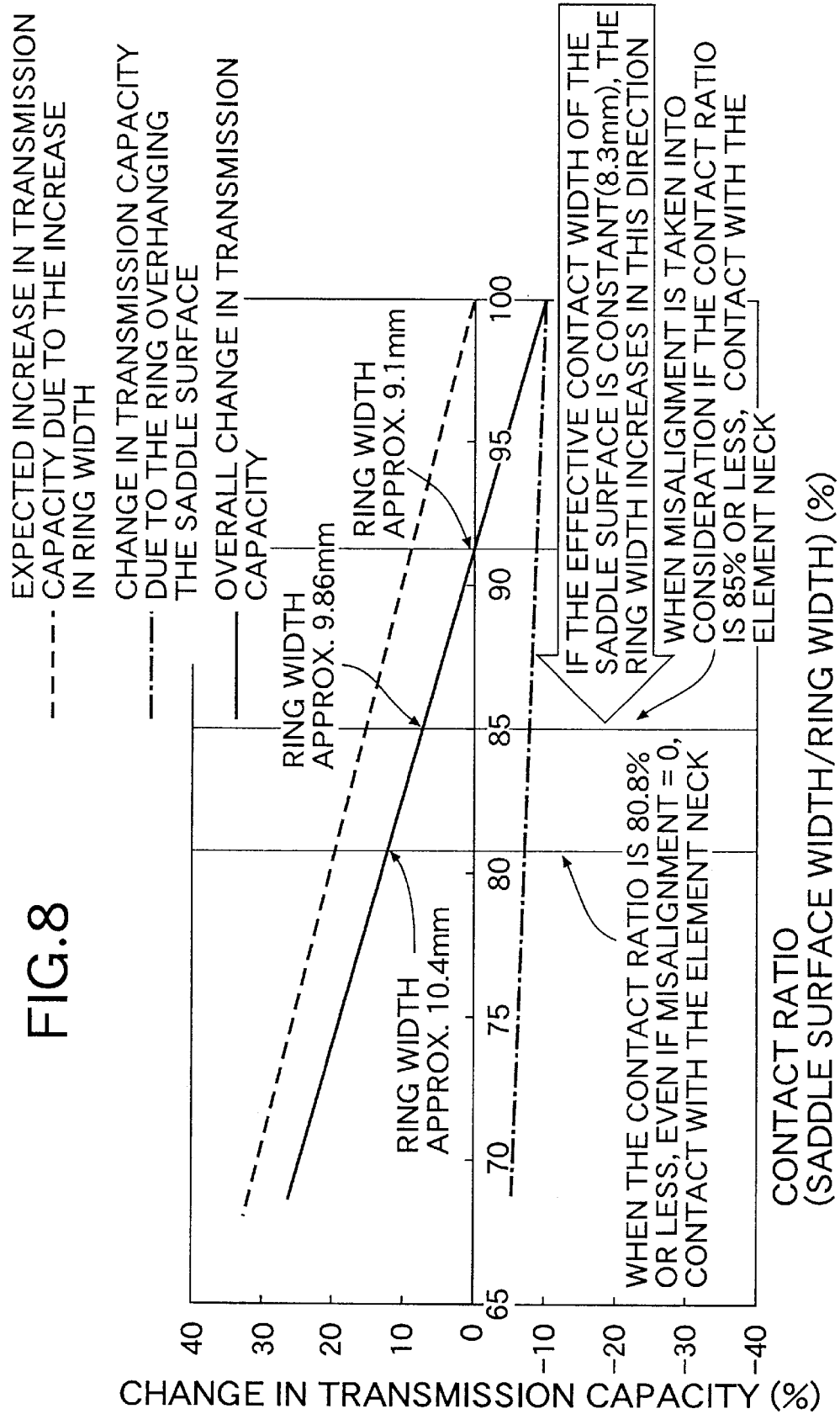

The graph shown in FIG. 8 corresponds to a state in which the metal ring assembly 31 has moved to the lateral inner edge of the ring slot 35 and is in contact with the neck part 38 of the metal element 32 (see FIG. 4). As mentioned above, the right end of the abscissa corresponds to a state in which the contact ratio C=100% (a state in which the lateral width Wr of the metal ring assembly 31 is set so as to be equal to the lateral width Ws of the saddle surface 39), and when the lateral width Wr of the metal ring assembly 31 is gradually increased from the above level, while maintaining the lateral width Ws of the saddle surface 39 constant, the contact ratio C gradually decreases from 100%.

As is clear when FIG. 4 and FIG. 8 are taken together, as the lateral width Wr of the metal ring assembly 31 is increased, the cross section thereof increases, thus increasing the transmission capacity of the metal belt 15. Therefore, if the state in which the contact ratio C=100% is taken as a reference, the percentage change in transmission capacity increases linearly from 0 in the positive direction as the lateral width Wr of the metal ring assembly 31 increases i.e. as the contact ratio C decreases (see the broken line in FIG. 8).

On the other hand when the lateral width Wr of the metal ring assembly 31 is increased since the amount of the metal ring assembly 31 whose lateral inner edge is defined as being in contact with the neck part 28, that is in contact with the saddle surface 39 increases, the proportion of overhang relative to the lateral width Wr of the metal ring assembly 31 decreases. As a result, the percentage change in transmission capacity increases linearly as the lateral width Wr of the metal ring assembly 31 increases i.e. as the contact ratio C decreases (see the dotted broken line in FIG. 8). The percentage change in transmission capacity is negative (−10%) when the contact ratio C=100% because the state in which the amount of overhang is 0 (a state in which the lateral outer edge of the metal ring assembly 31 is in contact with the V-face 30) is taken as the reference.

If the increase in transmission capacity accompanying the increase in cross section of the metal ring assembly 31 is combined with the increase in transmission capacity accompanying the decrease in the proportion of the metal ring assembly 31 which overhangs, the overall change in transmission capacity can be illustrated by the solid line in FIG. 8. This overall change in transmission capacity is negative in the range in which the contact ratio C is from 100% to 92%, and positive in the range in which the contact ratio C is 92% or less, suggesting that if the contact ratio C is held at 92% or less it is possible to increase the transmission capacity.

However, as described above, when the lateral width Wr of the metal ring assembly 31 increases, even if the misalignment α is 0 the lateral inner edge of the metal ring assembly 31 is in contact with the neck part 38 at a contact ratio C=80.8%; if the misalignment α is taken into consideration the lateral inner edge of the metal ring assembly 31 is in contact with the neck part 38 at a contact ratio C=85%, and thus the actually allowable contact ratio C is in the range from 100% to 85%. In conclusion, therefore, the durability of the metal belt 15 can be enhanced when the contact ratio C is in the range from 92% to 85%.

To summarize the above, in the state shown in FIG. 3 in which the metal ring assembly 31 has moved to the lateral outer edge of the ring slot 35 and is in contact with the V-face 30 of the drive pulley 6 or the driven pulley 11, the percentage change in transmission capacity becomes positive in the entire range of the actually allowable contact ratio C when the misalignment α is taken into consideration i.e. the range in which the contact ratio C is 100% to 85%, but in the state shown in FIG. 4 in which the metal ring assembly 31 has moved to the lateral inner edge of the ring slot 35 and is in contact with the neck part 38 of the metal element 32, the percentage change in transmission capacity becomes positive only in the range from 92% to 85% within the actually allowable range for the contact ratio C when the misalignment α is taken into consideration i.e. the range in which the contact ratio C is 100% to 85%. Therefore, the upper limit $C_{max}$ of the appropriate range for the contact ratio C is 92% at which point the percentage change in transmission capacity changes from negative to positive in the state shown in FIG. 4 and the lower limit $C_{min}$ of the appropriate range for the contact ratio C is 85% which is actually allowable when the misalignment α is taken into consideration.

Figure 9:
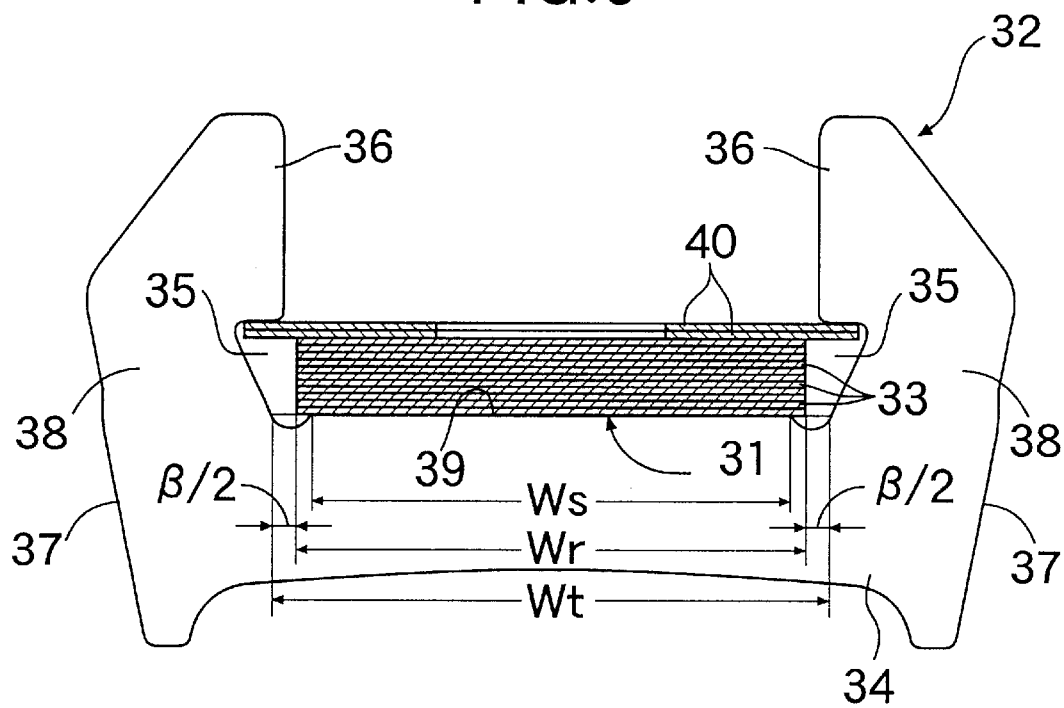
FIGS. 9 and 10 illustrate a second embodiment of the present invention.

A second embodiment of the present invention is next explained by reference to FIG. 9 and FIG. 10. In the second embodiment, the components corresponding to those in the first embodiment are denoted using the same numbers.

In the above-mentioned first embodiment, the metal belt 15 comprises two metal ring assemblies 31, 31, but the second embodiment comprises one metal ring assembly 31. The metal element 32 comprises right and left neck parts 38, 38, right and left ring slots 35, 35 on both the right and left sides of the central saddle surface 39, and ear parts 36, 36 which are formed connected to each of the right and left neck parts 38, 38 on the radially outer side, with the insides of the right and left neck parts 38, 38 in the radial direction, integrally connected via an element main body 34. In order that the metal ring assembly 31, in which multiple metal rings 33 are superimposed on each other, is retained inside the right and left ring slots 35, 35, retainers 40, 40 having a greater width than that of the metal ring assembly 31 are superimposed on the metal ring assembly 31 at the radially outer side.

The distance Wt between the right and left neck parts 38, 38 is set to be larger by a gap β than the lateral width Wr of the metal ring assembly 31, and therefore the metal ring assembly 31 can move laterally between the right and left neck parts 38, 38 within the gap β. FIG. 9 shows a state in which the metal ring assembly 31 is positioned in the center of the saddle surface 39 and FIG. 10 shows a state in which the metal ring assembly 31 has moved rightwards and the right edge thereof is in contact with the right neck part 38. In this case the left edge of the metal ring assembly 31 faces the left neck part 38 with a gap β between them. In the present embodiment also the lateral width Ws of the saddle surface 39 of the metal element 32 is set so as not to be larger than the lateral width Wr of the metal ring assembly 31, and as in the first embodiment the value obtained by dividing the lateral width Ws of the saddle surface 39 by the lateral width Wr of the metal ring assembly 31, is defined as the contact ratio C=Ws/Wr≦100%.

Figure 10:
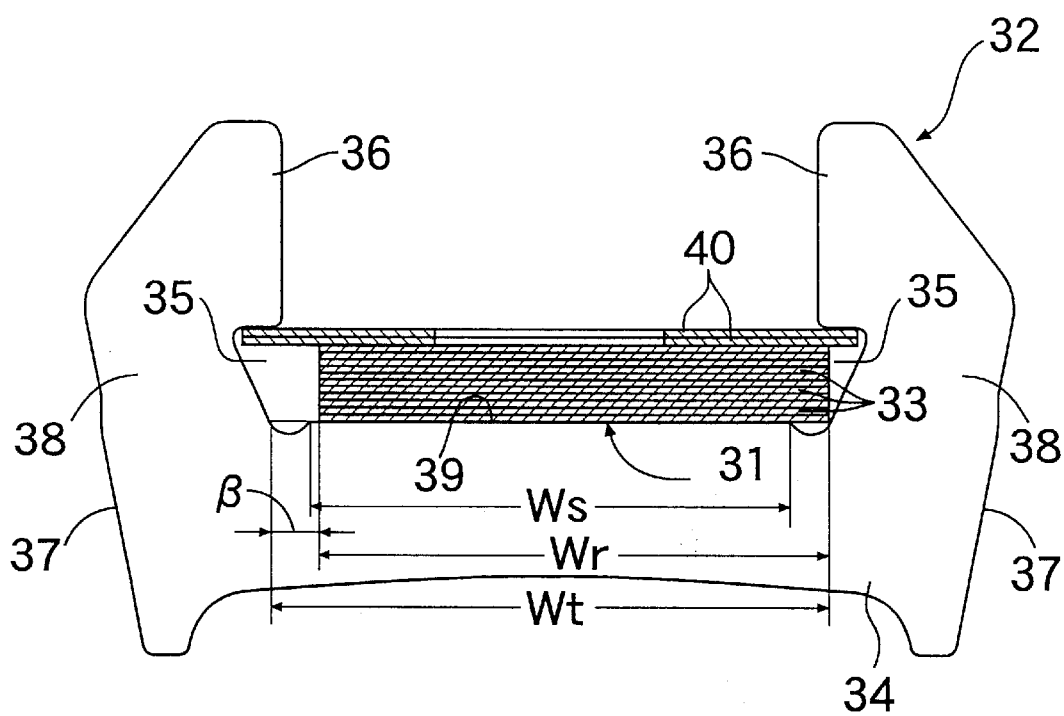

The state shown in FIG. 10 in which the metal ring assembly 31 has moved rightwards and is in contact with the right neck part 38, corresponds to the state shown in FIG. 4 in which the metal ring assembly 31 has moved laterally inwards and the right edge thereof is in contact with the neck part 38. In the second embodiment shown in FIG. 10 the left edge of the metal ring assembly 31 faces the left neck part 38 with a gap β between them, whereas in the first embodiment shown in FIG. 4 the laterally outer edge of the metal ring assembly 31 faces the V-face 30 of the drive pulley 6 or the driven pulley 11 with a gap β between them.

Thus, in the state shown in FIG. 10 in which the metal ring assembly 31 has moved rightwards and is in contact with the right neck part 38, when the lateral width Wr of the metal ring assembly 31 is gradually increased while maintaining the lateral width Ws of the saddle surface 39 constant, the contact ratio C gradually decreases from 100%. As in the first embodiment, when the contact ratio C reaches the upper limit value $C_{max}$ e.g. 92% from 100%, the percentage change in transmission capacity changes from negative to positive, and thus it is possible to increase the transmission capacity by keeping the contact ratio C below the upper limit value $C_{max}$.

In addition, as described above, when the lateral width Wr of the metal ring assembly 31 is increased and the contact ratio C reaches the minimum value $C_{min}$ (when a misalignment α is not taken into consideration, for example, 80.8%; or when a misalignment α is taken into consideration, for example, 85%) from 100%, since the left edge of the metal ring assembly 31 comes into contact with the left neck part 38, the actually allowable contact ratio C is in the range between the upper limit $C_{max}$ and the lower limit $C_{min}$.

As hereinbefore described, in accordance with the invention, since the maximum contact ratio is defined as the contact ratio at or below which a positive percentage change in power transmission capacity can be maintained and the minimum contact ratio is defined as the contact ratio at or above which the lateral edges of the metal rings can be prevented from coming into contact with both the neck parts of the metal elements and the V-faces of the pulleys, degradation of the transmission capacity due to the lateral width of the metal rings being too small and thus the cross section of the metal rings being insufficient, or due to the lateral width of the metal rings being too large and thus the metal rings overhanging the saddle surfaces of the metal elements can be prevented, and degradation of the durability due to the lateral edges of the metal rings being in contact with both the neck parts and the faces can be prevented.

Since the lower limit of the contact ratio is defined while taking into consideration the misalignment between the drive pulley and the driven pulley, even when a misalignment is present the lateral edges of the metal rings can effectively be prevented from coming into contact with both the neck parts of the metal elements and the V-faces of the pulleys.

Further, since the upper limit of the contact ratio is defined as the upper limit of the contact ratio at which a positive percentage change in power transmission capacity can be maintained and the lower limit of the contact ratio is defined as the contact ratio at or above which the lateral edges of the metal ring can be prevented from coming into contact with both the right and left neck parts of the metal elements, degradation of the transmission capacity due to the lateral width of the metal ring being too small and thus the cross section of the metal ring is insufficient, or due to the lateral width of the metal ring being too large and thus the metal ring overhanging the saddle surfaces of the metal elements, can be prevented, and degradation of the durability due to the lateral edges of the metal ring being in contact with both the right and left neck parts, can be prevented.

Since the lower limit of the contact ratio is defined while taking into consideration a misalignment between the drive pulley and the driven pulley, even when a misalignment is present, the lateral edges of the metal ring can effectively be prevented from coming into contact with both the right and left neck parts of the metal elements.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A belt for a continuously variable transmission having a drive pulley and a driven pulley, the belt comprising right and left metal rings formed into endless bands and a plurality of metal elements positioned on the metal bands, wherein the belt is wrapped around the drive pulley and the driven pulley and transmits power from the drive pulley to the driven pulley; each of the metal elements comprising a neck part, right and left ring slots extending from the neck part in directions away from each other and open at the sides thereof facing V-faces of the drive pulley and the driven pulley, and the metal elements having saddle surfaces, radially inner surfaces of the right and left metal rings fitting into the ring slots with a gap in a lateral direction, in contact with the saddle surfaces of the ring slots, wherein a contact ratio determined by dividing a lateral width of the saddle surface by the lateral width of the metal ring is between an upper limit and a lower limit, the upper limit being defined as the contact ratio at which the contact ratio is decreased by increasing the lateral width of the metal rings, in a state in which lateral inner edges of the metal rings are in contact with the neck part of the metal elements, and an increase in transmission capacity due to the increase in lateral width of the metal rings is counterbalanced by a decrease in transmission capacity due to an overhang of the metal rings from the saddle surfaces, and the lower limit being defined as the contact ratio at which the contact ratio is decreased in a state in which the lateral inner edges of the metal rings are in contact with the neck part of the metal elements and lateral outer edges of the metal rings come into contact with at least one of the V-faces of the drive pulley and driven pulley.

2. A belt for a continuously variable transmission according to claim 1, wherein when a misalignment is present between the drive pulley and the driven pulley, the lower limit is defined as the contact ratio at which the lateral outer edges of the metal rings come into contact with at least one of the V-faces of the drive pulley and driven pulley.

3. A belt for a continuously variable transmission according to claim 1, wherein the contact ratio is between 92% and 85%.

4. A belt for continuously variable transmission according to claim 1, wherein the lateral width of the saddle surface is equal to a selected percentage of the lateral width of the metal ring, the selected percentage being in a range of approximately 85% and 92%.

5. A belt for a continuously variable transmission having a drive pulley and a driven pulley, the belt comprising a metal ring formed into an endless band and a plurality of metal elements positioned on the metal ring, wherein the belt is wrapped around the drive pulley and the driven pulley, and transmits power from the drive pulley to the driven pulley; the metal elements comprising right and left neck parts, and right and left ring slots extending from the right and left neck parts in directions towards each other and open at sides thereof facing each other, and the metal elements having saddle surfaces, a radially inner surface of the metal ring fitting into the ring slots with a gap in a lateral direction, and being in contact with the saddle surfaces between the right and left ring slots, wherein a contact ratio determined by dividing a lateral width of the saddle surface by the lateral width of the metal ring, is between an upper limit and a lower limit, the upper limit being defined as the contact ratio at which the contact ratio is decreased by increasing the lateral width of the metal ring in a state in which a lateral edge of the metal ring is in contact with the neck parts on one side of the metal elements, an increase in transmission capacity due to the increase in the lateral width of the metal ring being counterbalanced by a decrease in transmission capacity due to an overhang of the metal ring from the saddle surfaces, and the lower limit being defined as the contact ratio at which, when the contact ratio is decreased in a state in which one lateral edge of the metal ring is in contact with the neck parts on one side of the metal elements, an other lateral edge of the metal ring comes into contact with the neck parts on the other side.

6. A belt for a continuously variable transmission according to claim 5, wherein when a misalignment is present between the drive pulley and the driven pulley, the lower limit is defined as the contact ratio at which the other lateral edge of the metal ring comes into contact with the neck parts on the other side.

7. A belt for a continuously variable transmission according to claim 5, wherein the contact ratio is between 92% and 85%.

8. A belt for continuously variable transmission according to claim 4, wherein the lateral width of the saddle surface is equal to a selected percentage of the lateral width of the metal ring, the selected percentage being in a range of approximately 85% and 92%.

\* \* \* \* \*